(12) United States Patent
Shu

(10) Patent No.: US 6,822,733 B1
(45) Date of Patent: Nov. 23, 2004

(54) OPTICAL DESIGN FOR LASER ENCODER RESOLUTION EXTENSION WITH THREE-DIMENSIONAL MOTION DECOUPLING

(75) Inventor: Deming Shu, Darien, IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 10/610,192

(22) Filed: Jun. 30, 2003

(51) Int. Cl.[7] .......................... G01B 11/26; G01B 11/14; G01C 1/00
(52) U.S. Cl. ..................................... 356/152.3; 356/614
(58) Field of Search .............................. 356/4.01–5.15, 356/152.1–152.3, 614, 139.03, 138.1

(56) References Cited

U.S. PATENT DOCUMENTS 3,708,231 A * 1/1973 Walters .................... 356/152.1
3,802,779 A * 4/1974 Fletcher et al. ........ 250/231.13
5,896,200 A    4/1999 Shu

* cited by examiner

Primary Examiner—Bernarr E. Gregory
Assistant Examiner—Brian Andrea
(74) Attorney, Agent, or Firm—Joan Pennington

(57) ABSTRACT

An optical system is provided for laser encoder resolution extension with three-dimensional motion decoupling capability. The optical system includes a first prism mounted on a moving target, and a plurality of prisms, a retroreflector, a laser source, and a detector mounted on a fixed base. The moving target has three-dimensional linear motion freedom. The first prism on the moving target and the plurality of prisms and the retroreflector on the fixed base reflect a laser beam from the laser source to the detector define a three-dimensional optical path. The three-dimensional optical path provides multiple times optical resolution extension power for linear displacement measurement and encoding. This optic system is only sensible to the target motion on X direction and is substantially unaffected by movement in the Y and Z directions.

20 Claims, 6 Drawing Sheets

24 TIMES
OPTICAL RESOLUTION EXTENSION

OPTICAL DESIGN FOR LASER ENCODER RESOLUTION EXTENSION WITH THREE-DIMENSIONAL MOTION DECOUPLING

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to a novel optical design for laser encoder resolution extension with three-dimensional motion decoupling capability.

DESCRIPTION OF THE RELATED ART

U.S. Pat. No. 5,896,200, issued Apr. 20, 1999 to Deming Shu issued to the present assignee and entitled "Optical design for laser encoder resolution extension and angular measurement," discloses a laser Doppler encoder including a set of prisms mounted on a fixed base along with an additional prism, an end retroreflector and a laser/detector and a second set of prisms mounted on a moving/rotating base. The laser/detector generates a laser beam that is transmitted through the sets of prisms on the fixed and moving bases as well as the additional prism and the end retroreflector until the laser beam finally reaches a heterodyning detector that is housed coaxially inside the laser/detector. The laser beam is a frequency-stabilized laser beam such that the laser beam that is reflected back to the heterodyning detector is frequency-shifted by the movement of the moving base relative to the fixed base so that the amount of movement (either rotational or linear) of the moving base can be accurately determined. Moreover, the end retroreflector enables the laser Doppler encoder to be readily self-aligned such that the alignment time is substantially reduced and the three-dimensional optical path configuration results in a compact and integrated optical design that optimizes the system's anti-vibration performance. The laser Doppler encoder can be used in conjunction with a high energy resolution monochromator for accurately determining the rotational movement of an arm in the monochromator or can be used in conjunction with a closed looped motion controller for providing feedback on the rotational displacement of the arm of the monochromator so that the arm can be accurately positioned.

The subject matter of the above-identified U.S. Pat. No. 5,896,200 is incorporated herein by reference.

While the above-identified U.S. Pat. No. 5,896,200 provides an improved optical design for laser encoder resolution extension and angular measurement, a need exists for a further enhanced optical design. It is desirable to provide such an enhanced optical design that enables three-dimensional measurements to be made with atomic scale resolution over a large two or three dimensional measuring range, rather than measurements in a single plane.

A principal object of the present invention is to provide a novel optical design for laser encoder resolution extension with three-dimensional motion decoupling capability.

SUMMARY OF THE INVENTION

In brief, an optical system is provided for laser encoder resolution extension with three-dimensional motion decoupling capability. The optical system includes a first prism mounted on a moving target, and a plurality of prisms, a retroreflector, a laser source, and a detector mounted on a fixed base. The moving target has three-dimensional linear motion freedom. The first prism on the moving target and the plurality of prisms and the retroreflector on the fixed base reflect a laser beam from the laser source to the detector define a three-dimensional optical path. The three-dimensional optical path provides multiple times optical resolution extension power for linear displacement measurement and encoding. This optic system is only sensible to the target motion on X direction and is substantially unaffected by movement in the Y and Z directions.

In accordance with features of the invention, instead of a typical single reflection on the moving target, the laser beam is reflected back and forth multiple times, such as twelve times or twenty-four times, between the fixed base and the moving target. The first prism mounted on the moving target is a larger prism than each of the plurality of prisms mounted on the fixed base. The detector is a heterodyning detector that is housed coaxially inside a frequency-stabilized laser source. The laser beam, which is reflected back to the heterodyning detector, is frequency-shifted by the movement of the moving target relative to the fixed base. With a laser Doppler displacement meter laser source and detector electronics, this optical path provides, for example, twelve times or twenty-four times optical resolution extension power for the linear displacement measurement and encoding.

In accordance with features of the invention, first and second optical design configurations are provided, each providing multiple self-aligned optical path design with three-dimensional motion decoupling capability. The plurality of prisms mounted on the fixed base in the first optical design configuration include at least one pair of prisms arranged substantially laterally aligned in spaced apart planes and at least a third laterally offset prism vertically spaced apart from the at least one pair of prisms. The retroreflector reflects the laser beam back to the laser source following the original optical path and finally reaching the detector that is arranged coaxially in a laser source housing. The retroreflector provides for a very practical self-alignment capability.

In accordance with features of the invention, the plurality of prisms mounted on the fixed base in the second optical design configuration include at least one pair of elongated prisms arranged substantially aligned in spaced apart planes and at least a third prism disposed near an upper plane between the at least one pair of elongated prisms.

BRIEF DESCRIPTION OF TH DRAWINGS

The present invention together with the above and other objects and advantages may best be understood from the following detailed description of the preferred embodiments of the invention illustrated in the drawings, wherein.

Figure 1:
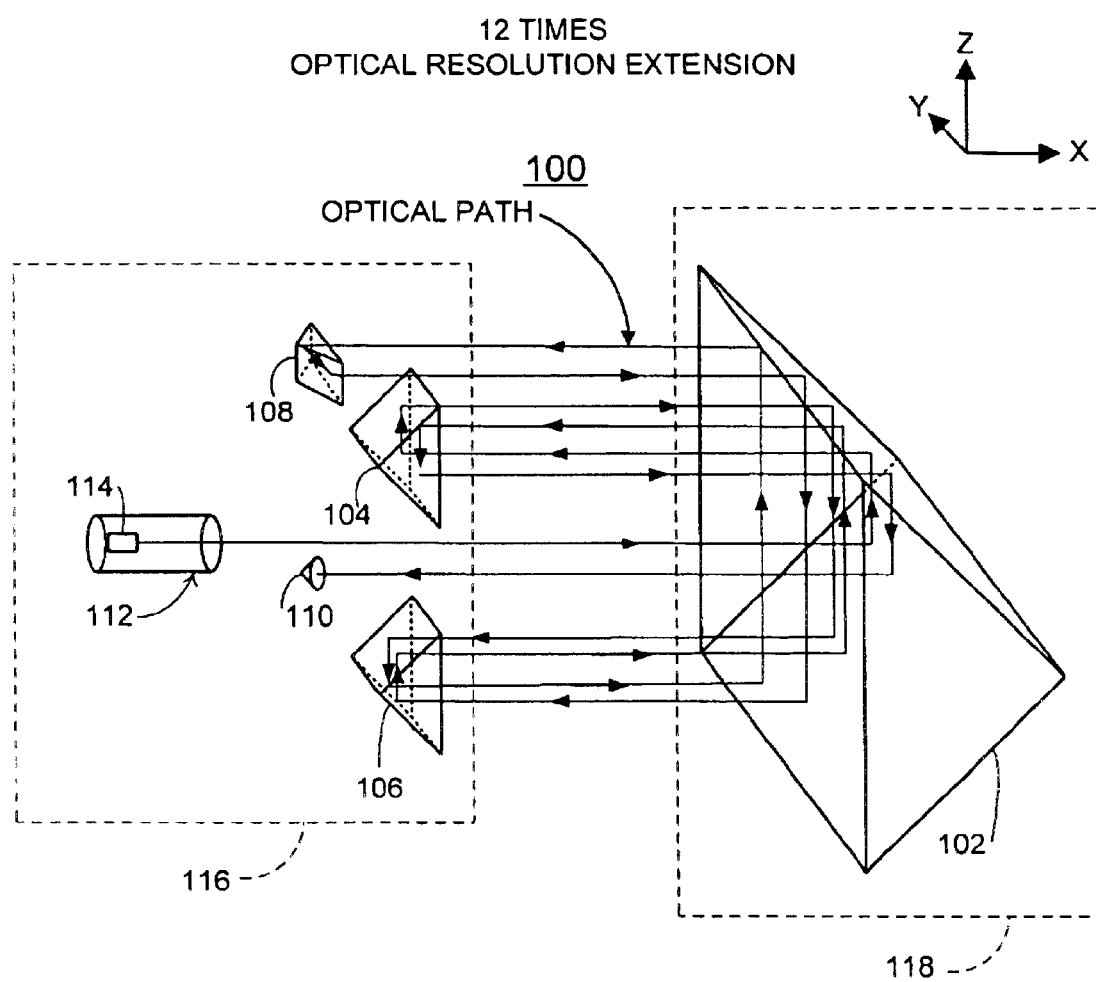
FIG. 1 is a schematic diagram of a first optical design configuration for a laser Doppler displacement meter (LDDM) system for twelve times (12 times) optical resolution extension in accordance with a first preferred embodiment.
Figure 2:
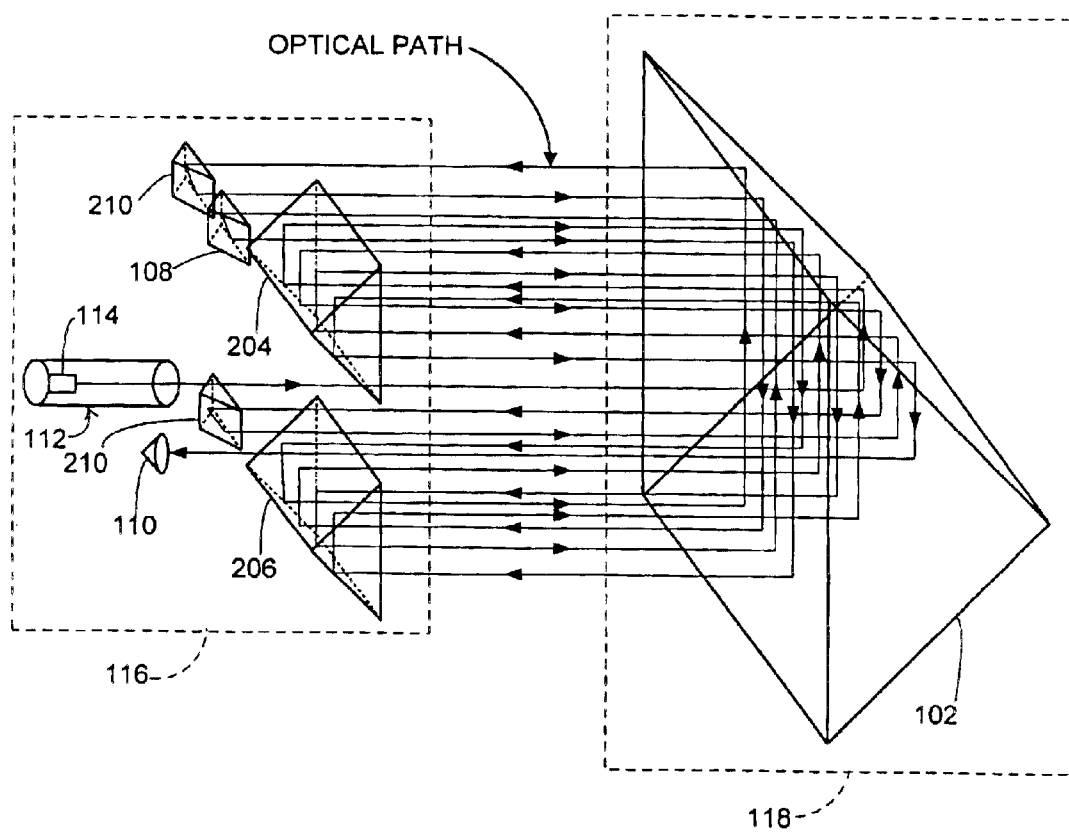
FIG. 2 is a schematic diagram of the first optical design configuration of FIG. 1 for a laser Doppler displacement meter (LDDM) system for twenty-four times (24 times) optical resolution extension in accordance with a first preferred embodiment.
Figure 3:
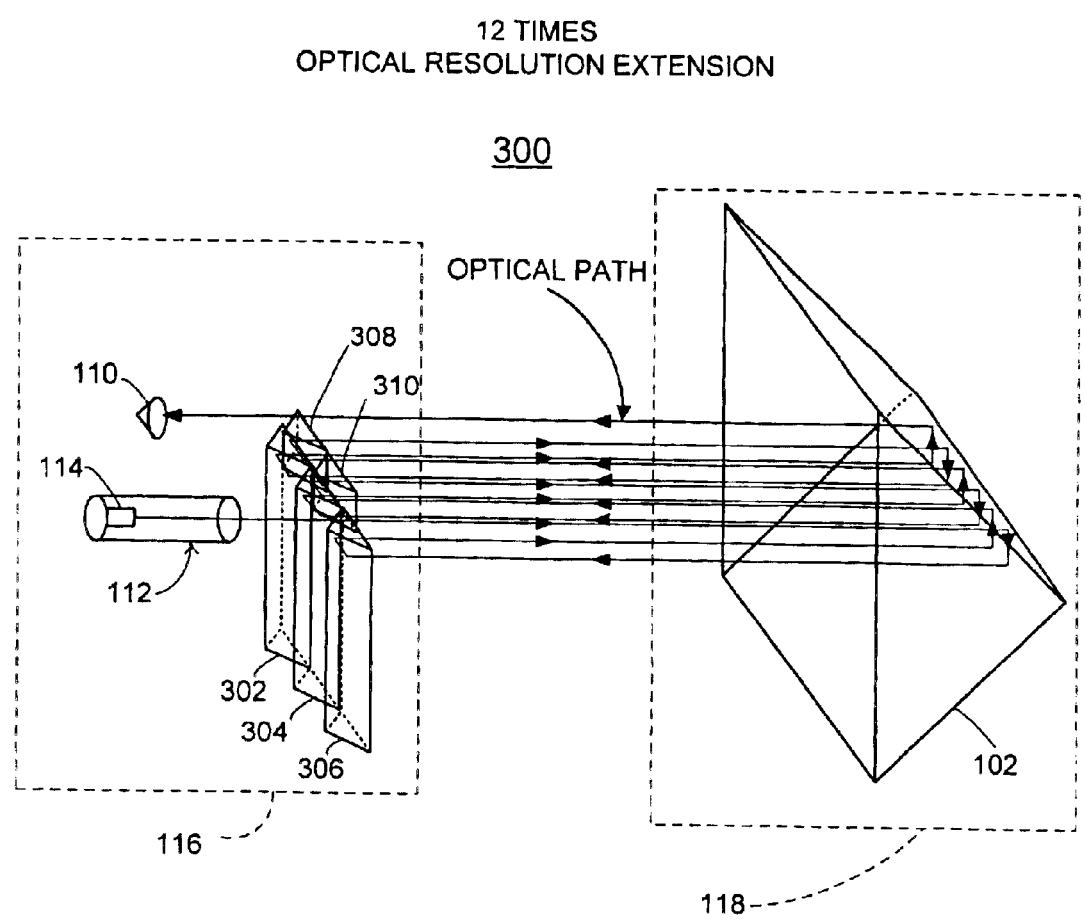
FIG. 3 is a schematic diagram of a second optical design configuration for a laser Doppler displacement meter (LDDM) system for 12 times optical resolution extension in accordance with another preferred embodiment.
Figure 4:
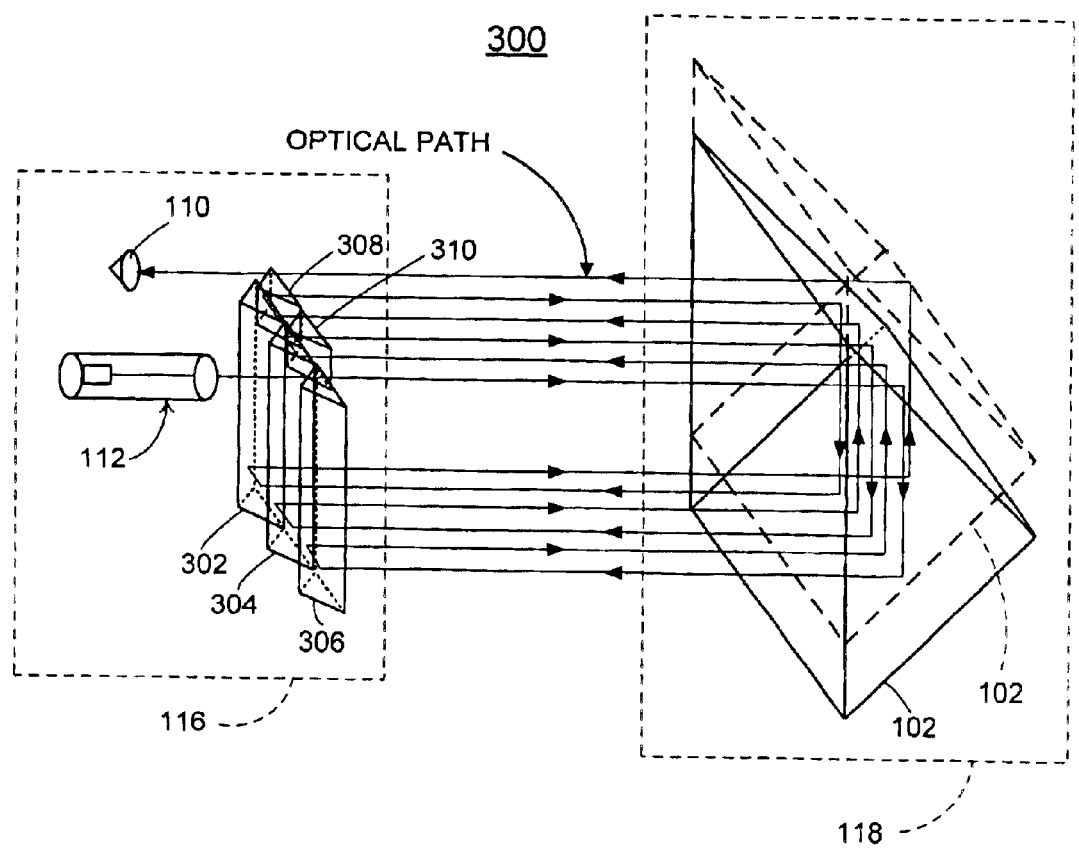
FIG. 4 is a schematic diagram of the second optical design configuration of FIG. 3 for a laser Doppler displacement meter (LDDM) system with a large Z motion of a moving target in accordance with another preferred embodiment.
Figure 5A:
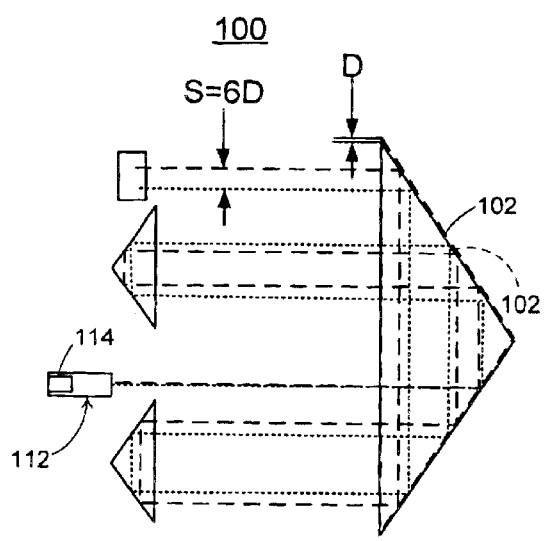
Figure 5B:
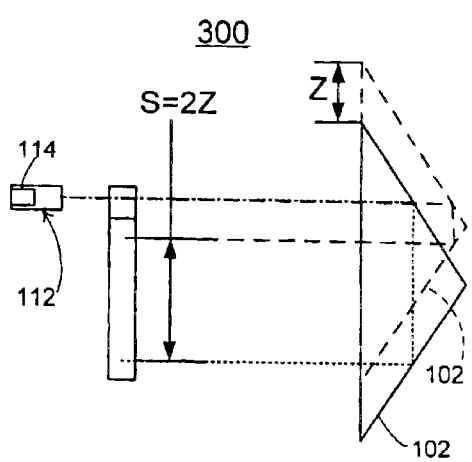
Figure 6:
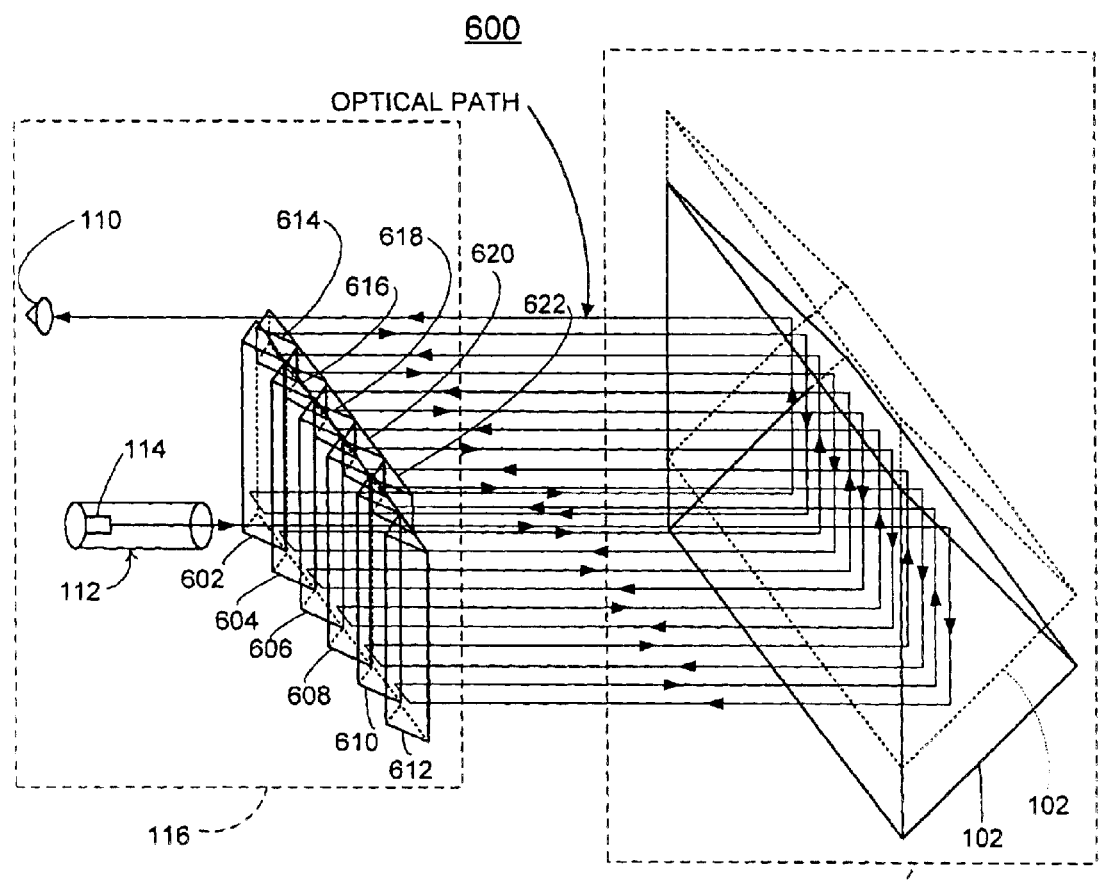

FIGS. 5A and 5B illustrate a motion decoupling dynamic range comparison between the first optical design configuration of FIGS. 1 and 2 and the second optical design configuration of FIGS. 3 and 4; and FIG. 6 is a schematic diagram of the second optical design configuration of FIG. 3 for a laser Doppler displacement meter (LDDM) system for 24 times optical resolution extension in accordance with a second preferred embodiment.

DETAILED DESCRIPTION OF THE PREFERRED EMBODIMENTS

In accordance with features of the invention, novel first and second optical design configurations are provided, each providing multiple self-aligned optical path design with three-dimensional motion decoupling capability. A first optical configuration includes less optical elements and has a smaller motion decoupling dynamic range in third motion direction. The first optical configuration as illustrated and described with respect to FIGS. 1, 2, and 5A is particularly applicable for a two-dimensional stage system. A second optical design configuration includes more optical elements while having a much larger motion decoupling dynamic range in third motion direction. The second optical design configuration as illustrated and described with respect to FIGS. 3, 4, 5B, and 6 is particularly suitable for a three-dimensional stage system. The present invention enables three-dimensional measurement with atomic scale resolution and large two-dimensional or three-dimensional measuring range (up to 50-mm or more).

Having reference now to the drawings, in FIG. 1 there is shown a first optical design configuration for a first optical system generally designated by reference character 100 in accordance with a first preferred embodiment of the invention. The first optical system 100 includes a first prism 102, and a plurality of prisms 104, 106, and 108, a retroreflector 110, a laser source including a laser-head and housing together indicated by reference character 112 containing a detector 114 that are mounted on a fixed base generally indicated by dotted line and reference character 116. The first prism 102 is a generally large prism mounted on a moving target generally indicated by reference character 118.

The moving target 118 and prism 102 has three-dimensional linear motion freedom. This optic system 100 is only sensible to the target motion on X direction and is substantially unaffected by movement in the Y and Z directions. The detector 114 is a heterodyning detector housed coaxially inside the frequency-stabilized laser source 112. Instead of a typical single reflection on the moving target, the laser beam is reflected back and forth twelve times between the fixed base 116 and the moving target prism 102, as indicated by arrows in FIG. 1 labeled OPTICAL PATH.

The plurality of prisms 104, 106, and 108 mounted on the fixed base 116 in the first optical design configuration of optical system 300 include at least one pair of prisms, such as prisms 104, 106 arranged substantially laterally aligned in spaced apart planes and at least a third laterally offset prism, such as prism 108, vertically spaced apart from the at least one pair of prisms. The laser beam, which is reflected back to the heterodyning detector 114, Is frequency-shifted by the movement of the moving target 118 relative to the fixed base 116. With one laser Doppler displacement meter (LDDM) laser source 112 and detector electronics 114, this optical path provides twelve times optical resolution extension power for the linear displacement measurement and encoding.

As shown in FIG. 1, the moving target prism 102, and prisms 104, 106, and 108 are formed by a set of right-angle prisms reflect the laser beam. The prism 108 reflects the beam back to a different zoom on prisms 102, 104 and 106. On the retroreflector 110, the laser beam is reflected back to the laser head 112, following the original path and finally reaching the detector 114, which is arranged coaxially in the laser head housing 112. The use of the retroreflector 110 provides for a very practical self-alignment capability. This reduces the total system assembly and alignment time substantially. Because the laser beam is reflected in the same optical path twice with opposite directions, this multiple-reflection optical design 100 provides unique system stability performance. The three-dimensional optical path configuration results in a compact and integrated optical design that optimizes the anti-vibration performance of optical system 100, which is critical for sub-Angstrom resolution in measurements.

Referring now to FIG. 2, there is shown a first optical design configuration or optical system generally designated by reference character 200 for a laser Doppler displacement meter (LDDM) system for twenty-four times optical resolution extension in accordance with a first preferred embodiment. In FIG. 2, the same reference numbers are used for substantially similar or identical components of optical system 200 as used for optical system 100 of FIG. 1.

There are many ways to change the total number of a reflection times in this design. For instance, to expand the optical path in the Y direction, one can add more prisms on the sides of the prism 108 and the retroreflector 110 to expand the optical path in the Y direction to perform a 24-times optical resolution extension power, as indicated by arrows in FIG. 2 labeled OPTICAL PATH. This optic system 200 is only sensible to the target motion on X direction and is substantially unaffected by movement in the Y and Z directions.

In optical system 200, the prism 102 similarly is mounted on moving target 118 as in optical system 100. Optical system 200 includes a plurality of prisms 204, 206, and 108, retroreflector 110, laser source 112, detector 114 and a pair of additional prisms 208 and 210 that are mounted on the fixed base 116.

As shown in FIG. 2, the optical system 200 includes the additional prism 208 on the side of prism 108 and the additional prism 210 near the retroreflector 110 for twenty-four times optical resolution extension in accordance with a first preferred embodiment. In optical system 200, the prisms 204, 206 are larger than prisms 104 and 106 of optical system 100 of FIG. 1 to accommodate the higher multiple times optical resolution extension power.

In general, the limit of the maximum reflection times is determined by the optical reflectivity of the reflecting elements to be used and the sensitivity of the LDDM laser detector electronics. Special coatings could be used on the surfaces of the reflecting elements to optimize the results.

Referring now to FIG. 3, there is shown a second optical design configuration or optical system generally designated by reference character 300 for a laser Doppler displacement meter (LDDM) system for twelve times optical resolution extension in accordance with another preferred embodiment of the present invention. In FIG. 3, the same reference numbers are used for substantially similar or identical components of optical system 300 as used for optical system 100 of FIG. 1. Optical system 300 with the second optical design configuration provides a much larger motion decoupling dynamic range in third motion direction or Z direction as compared to the first optical design configuration of FIGS. 1 and 2.

In optical system 300, a prism 102 similarly is mounted on moving target 118 as in optical system 100. Optical system 300 includes a plurality of elongated prisms 302, 304, 306, a pair of prisms 308 and 310 disposed near an upper plane between prisms 302, 304, 306 mounted on fixed base 116. Optical system 300 similarly includes retroreflector 110, laser source 112, and detector 114 mounted on fixed base 116. The moving target 118 has three-dimensional linear motion freedom. The optic system 300 similarly is only sensible to the target motion on X direction and is substantially unaffected by movement in the Y and Z directions.

As shown in FIG. 3, the laser beam is reflected by a set of right-angle prisms defining the prisms 102, 302, 304, 306, 308 and 310, as indicated by arrows in FIG. 3 labeled OPTICAL PATH. The retroreflector 110 reflects the beam back to the laser head 112, following the original path and finally reaching the detector 114, which is arranged coaxially in the laser-head housing 112. With the same LDDM laser source 112 and detector electronics 114, the optical path of optical system 300 provides twelve times optical resolution extension power for the linear displacement measurement and encoding.

For example, prism 102 can be implemented with a right-angle 25 millimeter×25 millimeter×25 millimeter (mm) prism. This typical 25 mm×25 mm×25 mm prism to prism 102 easily accommodates movement by 10 mm and the thickness or depth of prism 102 can be extended, for example to 50 mm for larger movement. For example, each of prisms 308 and 310 can be implemented with a right-angle 5 mm×5 mm×5 mm prism. For example, each of prisms 302, 304, and 306 can be implemented with a right-angle 5 mm×5 mm×30 mm prism. It should be understood that various other prisms and prism sizes could be used in accordance with the present invention.

Referring now to FIG. 4 and FIGS. 5A and 5B, FIG. 4 illustrates the optical path of optical system 300 with a large Z motion of the moving target 118. In FIG. 4, the first prism 102 is shown in an original position in dotted line and is shown in a moved location in solid line.

Comparing with the first optical design configuration of optical system 100, the second optical design configuration of system 300 is compatible with much larger Z direction motion of the moving target 102 as shown in FIGS. 5A and 5B. As shown in FIG. 5A, a prism incremental-movement D in the Z direction, which is perpendicular to the prism 102 measuring-direction X and a total sum S is equal to 6D. As shown in FIG. 5B, a prism incremental movement Z in the Z direction is substantially larger than the incremental movement D in FIG. 5A. The prism incremental movement Z in the Z direction is also perpendicular to the prism 102 measuring-direction X and a total sum S is equal to 2Z.

In the optical path of both the optical system 100 and the optical system 300 the total optical path length is always equal to an original optical path length with incremental movement in the Z direction. The optical path of both the optical system 100 and the optical system 300 is decoupled to the incremental movement in the Z direction of the prism 102. Similarly, the measuring-direction X of the both the optical system 100 and the optical system 300 is decoupled to the incremental movement in the Y direction of the prism 102.

FIG. 6 shows an example optical system generally designated by reference character 600 for a laser Doppler displacement meter (LDDM) system to expand the optical path in the Y direction to perform a 24-times optical resolution extension power with the second optical design configuration of optical system 300 of FIGS. 3, 4, and 5B. In FIG. 6, the same reference numbers are used for substantially similar or identical components of optical system 600 as used for optical system 100 of FIG. 1.

In optical system 600, a prism 102 similarly is mounted on moving target 118 as in optical system 100. Optical system 600 includes a plurality of elongated prisms 602, 604, 606, 608, 610, and 612, and a plurality of prisms 614, 616, 618, 620, and 622 disposed near an upper plane between respective pairs of prisms 602, 604, 606, 608, 610, and 612, each mounted on fixed base 116. Optical system 600 similarly includes retroreflector 110, laser source 112, and detector 114 mounted on fixed base 116. The moving target 118 has three-dimensional linear motion freedom. The optic system 600 similarly is only sensible to the target motion on X direction and is substantially unaffected by movement in the Y and Z directions.

FIG. 6 illustrates the optical path of optical system 600 with a large Z motion of the moving target 118 as indicated by arrows in FIG. 6 labeled OPTICAL PATH. In FIG. 6, the first prism 102 is shown in an original position in dotted line and is shown in a moved location in solid line.

It should be understood that the second optical design configuration is not limited to the illustrated optical system 300 and optical system 600. The second optical design configuration includes at least one pair of elongated prisms, such as the three prisms 302, 304, and 306 of the illustrated optical system 300 and the six prisms 602, 604, 606, 608, 610, and 612 of the illustrated optical system 600, arranged substantially aligned in spaced apart planes and at least a third prism, such as the two prisms 308, and 310 of optical system 300 and the five prisms 614, 616, 618, 620, and 622 of optical system 600, disposed near an upper plane between the at least one pair of elongated prisms. For example, the second optical design configuration can include two elongated prisms with a single prism disposed near an upper plane between the two elongated prisms or the second optical design configuration can include four elongated prisms with two prism disposed near an upper plane between respective pairs of the four elongated prisms.

While the present invention has been described with reference to the details of the embodiments of the invention shown in the drawing, these details are not intended to limit the scope of the invention as claimed in the appended claims.

What is claimed is:

1. An optical system for laser encoder resolution extension with three-dimensional motion decoupling capability comprising:

a moving target; said moving target having three-dimensional linear motion freedom;

a fixed base positioned laterally spaced apart in an X direction from said moving target;

a single first prism mounted on said moving target, a plurality of prisms, a retroreflector, a laser source, and a detector mounted on said fixed base;

said single first prism being larger than said plurality of prisms;

a three-dimensional optical path defined by said first prism, said plurality of prisms, and said retroreflector for reflecting a laser beam from said laser source to said detector with said laser beam being reflected multiple times between said single first prism and each of said plurality of prisms; said three-dimensional optical path providing multiple times optical resolution extension power for linear displacement measurement and encoding; said optical system being sensitive to a motion of said moving target in said X direction and being substantially unaffected by movement in a Y direction and a Z direction.

2. An optical system for laser encoder resolution extension with three-dimensional motion decoupling capability as recited in claim 1 wherein said retroreflector provides a self-alignment capability within said three-dimensional optical path.

3. An optical system for laser encoder resolution extension with three-dimensional motion decoupling capability as recited in claim 1 wherein said first prism mounted on said moving target includes a right angle prism.

4. An optical system for laser encoder resolution extension with three-dimensional motion decoupling capability as recited in claim 1 wherein said plurality of prisms mounted on said fixed base includes a plurality of right angle prisms.

5. An optical system for laser encoder resolution extension with three-dimensional motion decoupling capability as recited in claim 1 wherein said laser source includes a laser source housing and wherein said detector is arranged coaxially in a laser source housing.

6. An optical system for laser encoder resolution extension with three-dimensional motion decoupling capability as recited in claim 5 wherein said retroreflector reflects the laser beam back to said laser source following said three-dimensional optical path to said detector.

7. An optical system for laser encoder resolution extension with three-dimensional motion decoupling capability as recited in claim 1 wherein said detector includes a heterodyning detector.

8. An optical system for laser encoder resolution extension with three-dimensional motion decoupling capability as recited in claim 1 wherein said laser source includes a frequency-stabilized laser source.

9. An optical system for laser encoder resolution extension with three-dimensional motion decoupling capability as recited in claim 1 wherein said three-dimensional optical path provides twelve times optical resolution extension power for linear displacement measurement and encoding.

10. An optical system for laser encoder resolution extension with three-dimensional motion decoupling capability as recited in claim 1 wherein said three-dimensional optical path provides twenty-four times optical resolution extension power for linear displacement measurement and encoding.

11. An optical system for laser encoder resolution extension with three-dimensional motion decoupling capability as recited in claim 1 includes a first optical design configuration wherein said plurality of prisms mounted on the fixed base include at least one pair of prisms arranged substantially laterally aligned in spaced apart planes and at least one prism laterally offset and vertically spaced apart from said at least one pair of prisms.

12. An optical system for laser encoder resolution extension with three-dimensional motion decoupling capability as recited in claim 11 wherein said first prism mounted on said moving target includes a right angle prism and wherein said at least one pair of prisms and said at least one laterally offset prism include right angle prisms.

13. An optical system for laser encoder resolution extension with three-dimensional motion decoupling capability as recited in claim 11 wherein each of said at least one pair of prisms is larger than said at least one laterally offset prism.

14. An optical system for laser encoder resolution extension with three-dimensional motion decoupling capability as recited in claim 11 wherein said three-dimensional optical path provides twelve times optical resolution extension power for linear displacement measurement and encoding.

15. An optical system for laser encoder resolution extension with three-dimensional motion decoupling capability as recited in claim 11 wherein said three-dimensional optical path provides twenty-four times optical resolution extension power for linear displacement measurement and encoding.

16. An optical system for laser encoder resolution extension with three-dimensional motion decoupling capability as recited in claim 1 includes a second optical design configuration wherein said plurality of prisms mounted on the fixed base include at least one pair of elongated prisms arranged substantially aligned in spaced apart planes and at least one prism disposed near an upper plane between said at least one pair of elongated prisms.

17. An optical system for laser encoder resolution extension with three-dimensional motion decoupling capability as recited in claim 16 wherein said first prism mounted on said moving target includes a right angle prism and wherein said at least one pair of elongated prisms and said at least one prism include right angle prisms.

18. An optical system for laser encoder resolution extension with three-dimensional motion decoupling capability as recited in claim 16 wherein each of said at least one pair of elongated prisms is larger than said at least one prism.

19. An optical system for laser encoder resolution extension with three-dimensional motion decoupling capability as recited in claim 16 wherein said three-dimensional optical path provides twelve times optical resolution extension power for linear displacement measurement and encoding.

20. An optical system for laser encoder resolution extension with three-dimensional motion decoupling capability as recited in claim 16 wherein said three-dimensional optical path provides twenty-four times optical resolution extension power for linear displacement measurement and encoding.

* * * * *